(12) United States Patent
Liebner et al.

(10) Patent No.: US 12,117,295 B2
(45) Date of Patent: Oct. 15, 2024

(54) METHOD AND DEVICE FOR DETERMINING A TRAJECTORY OF A VEHICLE

(71) Applicant: Bayerische Motoren Werke Aktiengesellschaft, Munich (DE)

(72) Inventors: Martin Liebner, Munich (DE); David Pannen, Munich (DE); Thomas Schutzmeier, Unterhaching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 263 days.

(21) Appl. No.: 17/636,119

(22) PCT Filed: Jul. 28, 2020

(86) PCT No.: PCT/EP2020/071205
§ 371 (c)(1),
(2) Date: Feb. 17, 2022

(87) PCT Pub. No.: WO2021/043505
PCT Pub. Date: Mar. 11, 2021

(65) Prior Publication Data
US 2022/0290991 A1    Sep. 15, 2022

(30) Foreign Application Priority Data
Sep. 3, 2019 (DE) ............ 10 2019 123 538.3

(51) Int. Cl.
*G01S 19/40* (2010.01)
*G01C 21/00* (2006.01)
(Continued)

(52) U.S. Cl.
CPC ......... *G01C 21/005* (2013.01); *G01C 21/165* (2013.01); *G01C 21/3804* (2020.08);
(Continued)

(58) Field of Classification Search
CPC ............ G01C 21/005; G01C 21/165; G01C 21/3804; G01S 19/393; G01S 19/40
See application file for complete search history.

(56) References Cited

U.S. PATENT DOCUMENTS

| 2008/0228395 A1 | 9/2008 | Kobori et al. |
| 2010/0217517 A1 | 8/2010 | Oohashi et al. |
| 2019/0323845 A1* | 10/2019 | Agarwal ............ B60R 11/04 |

FOREIGN PATENT DOCUMENTS

| CN | 104374395 A | 2/2015 |
| CN | 107229063 A | 10/2017 |

(Continued)

OTHER PUBLICATIONS

Chinese-language Office Action issued in Chinese Application No. 2020800603021 dated May 9, 2023 with English translation (13 pages).

(Continued)

*Primary Examiner* — Charles J Han
(74) *Attorney, Agent, or Firm* — Crowell & Moring LLP

(57) ABSTRACT

A device estimates an actual trajectory of a vehicle. The device is designed to determine a sequence of measured position values over a corresponding sequence of times by use of a position sensor. The device is further designed to determine a sequence of odometry values on the basis of sensor data from one or more vehicle sensors. The device is also designed to determine, as an estimation of the actual trajectory of the vehicle, a sequence of estimated pose values for the sequence of times and a systematic position offset for the sequence of measured position values so that an optimization criterion is improved, in particular is optimized at least locally.

16 Claims, 8 Drawing Sheets

(51) Int. Cl.
 G01C 21/16 (2006.01)
 G01S 19/39 (2010.01)
 G01S 19/47 (2010.01)
(52) U.S. Cl.
 CPC ............ *G01S 19/393* (2019.08); *G01S 19/40* (2013.01); *G01S 19/47* (2013.01)

(56) References Cited

FOREIGN PATENT DOCUMENTS

| | | | |
|---|---|---|---|
| CN | 107272673 A | | 10/2017 |
| CN | 109029433 A | | 12/2018 |
| CN | 109887032 A | | 6/2019 |
| DE | 10 2016 205 193 A1 | | 10/2017 |
| DE | 10 2016 223 999 A1 | | 6/2018 |
| WO | WO 2020/016385 A1 | | 1/2020 |

OTHER PUBLICATIONS

International Search Report (PCT/ISA/210) issued in PCT Application No. PCT/EP2020/071205 dated Oct. 30, 2020 with English translation (four (4) pages).
German-language Written Opinion (PCT/ISA/237) issued in PCT Application No. PCT/EP2020/071205 dated Oct. 30, 2020 (seven (7) pages).
German-language Search Report issued in German Application No. 10 2019 123 538.3 dated Mar. 20, 2020 with partial English translation (11 pages).

\* cited by examiner

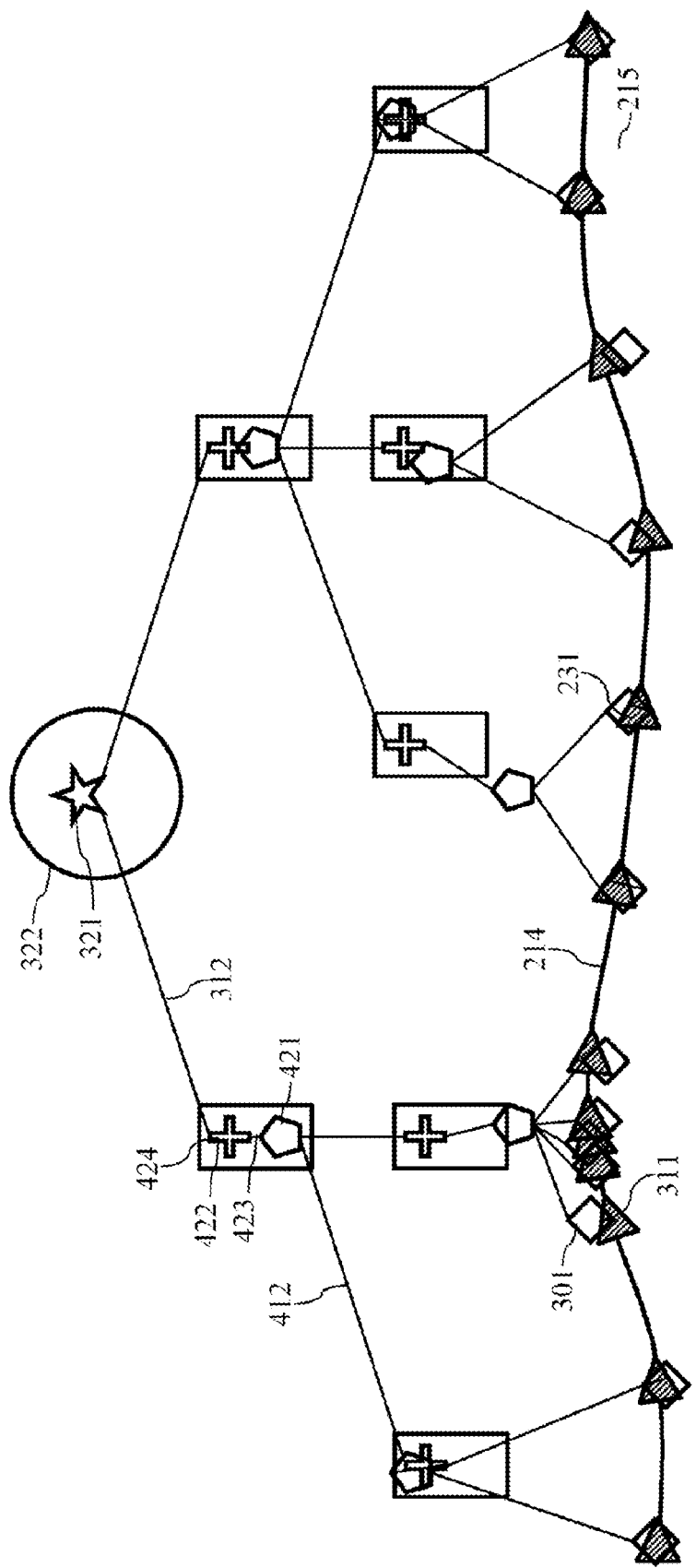

METHOD AND DEVICE FOR DETERMINING A TRAJECTORY OF A VEHICLE

BACKGROUND AND SUMMARY OF THE INVENTION

The invention relates to a method and a corresponding device for ascertaining the trajectory traveled by a vehicle, in particular in order to generate a highly accurate digital (HD) map for a road network.

For safe, comfortable and efficient automated driving, a vehicle can use highly accurate digital maps in order to extend and/or complement the vehicle sensor system. An HD map provides a priori knowledge about the vehicle environment, facilitating an improved localization of the vehicle and/or the detection of outliers in the vehicle sensor system. Moreover, HD maps can serve as a fallback level in the case of a sensor failure and can improve the comfort of an automated driving function by way of further foresight. Moreover, HD maps may comprise information about drivability and connectivity of lanes and about traffic rules in force, by means of which the automated driving is improved.

Dedicated mapping vehicles which are equipped with a number of highly accurate sensors such as lidar (light detection and ranging) and/or highly accurate GPS receivers can be used to create an HD map. However, the use of dedicated mapping vehicles is connected with relatively high costs. Moreover, the number of mapping vehicles is typically limited, and so only a relatively small proportion of the road network can be regularly traveled on and/or the frequency of being traveled on is relatively low for an individual road segment. As a consequence, changes in the road network may possibly not always be identified in a timely manner and be taken into account in an HD map. Then again, the use of insufficiently current HD maps can impair the quality of an automated driving function of a vehicle.

In order to reduce the outlay for checking and/or adapting an HD map and/or in order to increase the frequency of checking and/or adapting an HD map, it is possible to collect and evaluate driving data from (conventional) vehicles. In this case, the driving data from a vehicle may comprise sensor data from different sensors of the vehicle. Then, trajectories of the individual vehicles can be ascertained on the basis of the driving data from the individual vehicles, and from these it is possible in turn to deduce the course of lanes. The driving data of vehicles can consequently be used to adapt an HD map.

The accuracy and/or the resolution of the sensor data of the one or more sensors of a vehicle is typically lower than the accuracy and/or the resolution of the sensor data of the sensor of a mapping vehicle. The present document considers the technical problem of being able to ascertain the trajectory of a vehicle with the highest possible accuracy even when sensor data with a relatively low accuracy are used, in particular in order to be able to use the ascertained trajectory for the creation and/or the adaptation of a digital map.

The problem is solved by each of the independent claims. Advantageous embodiments are described, inter alia, in the dependent claims. Attention is drawn to the fact that additional features of a patent claim dependent on an independent patent claim can, without the features of the independent patent claim or just in combination with a subset of the features of the independent patent claim, form a separate invention that is independent of the combination of all of the features of the independent patent claim and that can be turned into the subject matter of an independent claim, of a divisional application or of a subsequent application. This applies in the same way to technical teaching described in the description, which may form an invention that is independent of the features of the independent patent claims.

According to one aspect, a device is described for estimating an actual (driving) trajectory of a vehicle. In this case, the trajectory can be estimated on the basis of sensor data from one or more sensors of the vehicle. The device can be arranged at least in part (or in full) within the vehicle and/or at least in part (or in full) outside of the vehicle (e.g., on a backend server). The device can be configured to create and/or adapt a digital map in relation to a road network on the basis of the estimate of the actual trajectory of the vehicle. The digital map then can be used to provide an automated driving function (in particular for highly automated driving). The digital map can describe the course of roads and/or roadways and/or lanes of the road network relative to a reference coordinate system (e.g., relative to the world coordinate system).

The device can be configured to ascertain a sequence of measured position values in relation to the respective position of the vehicle over a corresponding sequence of times on the basis of the sensor data of a position sensor (of the vehicle). In this case, a measured position value may comprise coordinates, in particular GPS coordinates, in relation to the position of the vehicle within the reference coordinate system (e.g., within the world coordinate system) for the road network. The sequence of measured position values may consequently describe a measured trajectory of the vehicle within the reference coordinate system. Stochastic and/or systematic deviations of the individual measured position values from the respective actual position of the vehicle may arise in the process on account of measurement errors and/or on account of measurement inaccuracies.

The device is further configured to ascertain a sequence of odometry values for at least a part of the sequence of times on the basis of sensor data from one or more vehicle sensors (of the vehicle). In this case, an odometry value at any one time can indicate how the pose (that is to say the position and/or the orientation of the vehicle) has changed in comparison with a (directly) preceding time. Exemplary vehicle sensors indicate the speed of travel, the steering angle, the acceleration and/or the yaw rate of the vehicle. A pose value can indicate the pose of the vehicle. For this purpose, a pose value may comprise coordinates in relation to the position of the vehicle within a coordinate system of the vehicle. An odometry value can indicate the change in the position (and/or the orientation) of the vehicle relative to the coordinate system of the vehicle between two times. In the process, the coordinate system of the vehicle may be shifted in relation to the reference coordinate system. Consequently, the odometry values may indicate how the position (and optionally the orientation) of the vehicle has respectively changed (relative to the coordinate system of the vehicle) between two times over the sequence of times.

Consequently, a sequence of pose values which indicates a trajectory that is shifted (and optionally rotated) in relation to the actual trajectory of the vehicle might be ascertained on the basis of the odometry values. Moreover, the odometry values may contain errors (on account of measurement uncertainties of the one or more vehicle sensors), and so the pose values ascertained purely on the basis of the odometry values (in addition to a translation and/or rotation) typically differ from the actual pose values of the vehicle.

The device may be configured to combine and/or overlay the sequence of measured position values and the sequence of odometry values in order to ascertain an estimate of the actual trajectory. In so doing, it is possible to take into account a (systematic) position offset in order to uniformly shift the measured position values and hence in order to take into account and compensate a systematic error when measuring the measured position values (in particular the measured GPS or satellite coordinates).

In particular, the device can be configured to ascertain a sequence of estimated pose values for the sequence of times as an estimate of the actual trajectory of the vehicle. In this case, an estimated pose value at a specific time may indicate the pose of the vehicle relative to the reference coordinate system at the specific time. Moreover, the (uniform) value of the position offset for the sequence can be ascertained from measured position values. In the process, the sequence of estimated pose values and the value of the position offset can be ascertained in such a way that an optimization criterion is improved, especially optimized at least locally.

The optimization criterion may comprise a position value deviation term for each time of the sequence of times. The position value deviation term at any one time may depend on the (e.g., square) deviation of the estimated pose value at that respective time from the measured position value at that respective time, which is offset by the (uniform and/or systematic) position offset. In this way, it is possible to ascertain the sequence of estimated pose values (and hence the estimate of the trajectory) in particularly precise fashion.

Alternatively or in addition, the optimization criterion may comprise an odometry deviation term for at least some of the times of the sequence of times (in particular for N−1 times in the case where the sequence of times comprises N times). Here, the odometry deviation term at any one time may depend on the (optionally square) deviation of the change in the pose of the vehicle emerging from the sequence of estimated pose values at that time from the odometry value at that time.

The optimization criterion may therefore be designed to ascertain the sequence of estimated pose values in such a way that the (mean) deviation of the estimated pose values from the measured odometry values and from the measured position values (shifted by the position offset) is reduced, in particular minimized. In this way it is possible to estimate the actual trajectory of the vehicle in particularly precise fashion.

The device can be configured to ascertain the estimate of the actual trajectory of the vehicle by means of a graph SLAM process, that is to say a graph simultaneous localization and mapping process. In so doing, the position offset can in a preferred example be taken into account as a shiftable anchor vertex within the scope of the graph SLAM process. This facilitates a particularly efficient and precise estimate of the actual trajectory.

As already presented above, the measured position values typically have a certain position measurement uncertainty. As a consequence thereof, each measured position value may be associated with a probability distribution of possible values about the respectively measured position value. The optimization criterion may depend on the position measurement uncertainty (in particular on the probability distribution) of the measured position values. In this case, the dependency may be such that an increase in the position measurement uncertainty (or a broadening of the probability distribution) leads to a reduction in the effect of the position value deviation terms on the optimization criterion. This can further increase the accuracy of the estimate of the actual trajectory.

The odometry values typically also have an odometry measurement uncertainty in a corresponding manner. As a consequence thereof, each measured odometry value may be associated with a probability distribution of possible values about the respectively measured odometry value. The optimization criterion may depend on the odometry measurement uncertainty (in particular on the probability distribution) of the odometry, in particular in such a way that an increase in the odometry measurement uncertainty (or a broadening of the probability distribution) leads to a reduction in the effect of the odometry deviation terms on the optimization criterion. This can further increase the accuracy of the estimate of the actual trajectory.

The device can be configured to ascertain the position offset for the sequence of measured position values in such a way that the value of the position offset is the same for all measured position values of the sequence of measured position values and/or for all times of the sequence of times. Expressed differently, it is possible to take into account a common (systematic) position offset for all measured position values of the trajectory. This allows a systematic error acting over the entire trajectory (e.g., a systematic error that can be traced back to the atmosphere) to be taken into account and compensated efficiently and precisely when measuring the measured position values.

The device can be configured to restrict the value of the position offset to a maximum value. Alternatively or in addition, the device can be configured to ascertain the value of the position offset while taking account of a covariance and/or a probability distribution for the position offset. Alternatively or in addition, the optimization criterion may comprise a term by way of which an increase in terms of magnitude of the value of the position offset is penalized. In this way, a precise localization of the estimate of the actual trajectory within the reference coordinate system (in particular within the world coordinate system) can be brought about in efficient and reliable fashion.

The device can be configured to subdivide the sequence of times into a plurality of successive subsequences. The measured position values of a subsequence can then each be shifted by a partial position offset for the subsequence and by the position offset for the entire sequence for the purposes of ascertaining the estimate of the actual trajectory. In particular, the device can be configured to ascertain the sequence of estimated pose values for the sequence of times, the position offset for the entire sequence of measured position values and the plurality of partial position offsets for the plurality of subsequences in such a way that the optimization criterion is improved, especially optimized at least locally. As a result of taking into account partial position offsets for different portions of the trajectory of the vehicle, it is possible to efficiently take into account and compensate locally acting systematic errors (such as, e.g., local multipath effects) when measuring the measured position values. In this way, it is possible to further increase the quality of the estimate of the actual trajectory.

As already presented above, the device can be configured to ascertain the estimate of the actual trajectory by means of a graph SLAM process. To this end, the device can be configured to create a graph, wherein the graph comprises the individual estimated pose values of the sequence of estimated pose values as vertices (which are referred to as pose variable vertices in this document). In this case, the estimated pose values can be initialized on the basis of the measured position values and/or on the basis of the (measured) odometry values. The graph with the initialized, estimated pose values can then be used as a starting point for the (iterative) optimization of the graph and hence for the estimate of the actual trajectory.

As an edge between two pose variable vertices, the graph may comprise an odometry factor which is dependent on the sensor data from the one or more vehicle sensors, and/or which indicates a movement of the vehicle between the two vertices. In particular, the odometry factor between the pose variable vertex at a certain time and the pose variable vertex at a preceding time may depend on the measured odometry value for the determined time. In this case, the odometry factor may indicate a probability distribution in relation to the change of the pose values between two pose variable vertices.

The graph can further have a position variable vertex for each measured position value. Moreover, for each of the pose variable vertices the graph may comprise an association via a position factor (i.e., via an edge) to a corresponding position variable vertex (or to a corresponding measured position value). In this case, it is possible by way of the position factor to indicate how the position variable vertex is arranged relative to the respective pose variable vertex. In this case, the position factor may depend on the measured position value for the respective position variable vertex. In particular, the position variable vertex at a given time may be arranged at a position within the graph that corresponds to the measured position value for the specific time. The position factor (i.e., the edge) between a pose variable vertex and a corresponding position variable vertex may be associated with a probability distribution that depends on the position measurement uncertainty.

Consequently, position variable vertices can be provided on the basis of the measured position values and (initialized) pose variable vertices of a graph can be provided on the basis of the measured odometry values. The vertices may be interconnected by way of edges, wherein the edges may each be associated with a probability distribution or a covariance which depends on the position measurement uncertainty and/or on the odometry measurement uncertainty. Thus, the available sensor data in relation to the position of the vehicle can be efficiently represented within a graph.

The position variable vertices of the graph can (rigidly) be connected to a position anchor (that is to say to an anchor vertex) in such a way that a shift of the position anchor leads to a corresponding shift of the position variable vertices of the graph. Thus, the position offset can be efficiently taken into account within the graph.

The device can be configured to ascertain the sequence of estimated pose values (that is to say the estimated value of the actual trajectory) by optimizing the graph. In this case, optimizing the graph may comprise shifting the position anchor and/or changing one or more pose values of the sequence of pose values and/or shifting the pose variable vertices. The graph can be optimized in such a way that a certain optimization criterion is improved, especially optimized at least locally. As described further above, the optimization criterion may comprise position deviation terms and/or odometry deviation terms. By describing the optimization problem as a graph it is possible to ascertain the sequence of estimated pose values in a particularly efficient and precise manner.

Within the scope of optimizing the graph, the device can be configured to change a pose of the position anchor on the basis of a probability distribution for the pose of the position anchor. In this case, the probability distribution can be such that a translation of the position anchor is facilitated, and a rotation of the position anchor is substantially suppressed. This allows a position offset and hence a systematic error of the measurement of the measured position values to be taken into account and compensated in a particularly reliable manner.

As already presented above, the sequence of times may comprise a plurality of successive subsequences. The position variable vertices of the graph of a subsequence may then each be connected to an intermediate anchor such that a shift of the intermediate anchor leads to a corresponding shift of the position variable vertices of the subsequence. Moreover, the intermediate anchors of the plurality of subsequences may be connected to the position anchor in such a way that a shift of the position anchor leads to a corresponding shift of the intermediate anchors of the plurality of subsequences. By taking into account one or more intermediate anchors, it is also possible to reliably and precisely ascertain and compensate locally acting systematic errors when measuring the measured position values.

The device can be configured to ascertain a measurement position of a landmark in an environment of the vehicle for a certain time in the sequence of times on the basis of sensor data from one or more environment sensors (e.g., cameras and/or lidar sensors) of the vehicle. Then it is possible to take into account a landmark deviation term in the optimization criterion, wherein the landmark deviation term may depend on the deviation of the measurement position of the landmark from a reference position of the landmark. The quality of the estimate of the actual trajectory can be further increased by taking into account one or more landmarks.

The device can be configured to ascertain a respective sequence of measured position values over a corresponding sequence of times for a plurality of journeys over a segment of a road network (and optionally within a restricted time interval). Moreover, the device can be configured to ascertain a respective sequence of odometry values for at least a part of the sequence of times for the plurality of journeys. Moreover, the device can be configured to respectively ascertain a sequence of estimated pose values for the sequence of times and a position offset for the plurality of journeys. In this case, the sequences of estimated pose values (that is to say the estimates of the actual trajectories for the different journeys) and the position offset can be ascertained in such a way that an optimization criterion is improved in each case, especially optimized at least locally. Moreover, the sequences of estimated pose values (that is to say the estimates of the actual trajectories for the different journeys) and the position offset can be ascertained in such a way that the position offset is the same for the plurality of journeys (in particular if the plurality of journeys were carried out within a relatively short time interval). In this way, it is efficiently possible to take into account that a systematic error in the position measurement has the same effect on different journeys. As a result, the quality of the ascertained estimates of the actual journeys can be increased further.

Then again, a specific position offset can be optionally ascertained at least in part for the different journeys (in particular if the different journeys are relatively far apart in time). Thus it is possible to reliably identify and take account of changes in the presence of systematic measurement errors.

Attention is drawn to the fact that the specification of a uniform position offset for a plurality of journeys in one segment of the road network can be applied in a corresponding manner to partial position offsets (for partial segments of the segment), to a position anchor (for the segment) and/or to the intermediate anchors (for partial segments of the segment). Thus, it is possible in particular to also take account of and compensate local systematic errors efficiently and precisely when measuring the position.

The device can be configured to ascertain alternative data in relation to the position of the vehicle and to ascertain a value of at least one further deviation term for the optimization criterion on the basis of the alternative data. In this case, the at least one further deviation term can be such that a significant increase in the value of the position offset is caused by the further deviation term. By way of example (as presented above), the further deviation term may depend on a landmark and/or depend on the measured position values which were collected during a further journey. The alternative data can consequently comprise, for example, the measurement position of a landmark and/or measured position values of a further journey. By taking into account alternative data in relation to the position of the vehicle, it is possible to ascertain and compensate a systematic error when measuring position data in particularly reliable and precise fashion.

The device can be configured to receive the sensor data of the position sensor of the vehicle, or data derived therefrom, from the vehicle. Moreover, the device can be configured to receive the sensor data of the one or more vehicle sensors of the vehicle, or data derived therefrom, from the vehicle. The data can be received by way of a (wireless) communications link, for example. The sequence of estimated pose values for the sequence of times can then be ascertained by the (vehicle-external) device on the basis of the received data.

According to a further aspect, a (road) motor vehicle (in particular an automobile or a truck or a bus or a motorcycle) and/or a vehicle-external unit (e.g., a server) which comprise (s) the device described in this document are/is described.

According to a further aspect, a (computer-implemented) method for estimating an actual trajectory of a vehicle is described. The method comprises the ascertainment, on the basis of the sensor data from a position sensor, of a sequence of measured position values in respect of a respective position of the vehicle over a corresponding sequence of times. The measured position values can indicate the position of the vehicle relative to a reference coordinate system. Moreover, the method comprises the ascertainment, on the basis of sensor data from one or more vehicle sensors, of a sequence of odometry values for at least a part of the sequence of times. In this case, an odometry value for any one time can indicate how the pose of the vehicle has changed in comparison with a (directly) preceding time.

The method further comprises the ascertainment (as an estimate of the actual trajectory of the vehicle) of a sequence of estimated pose values for the sequence of times and the ascertainment of a (systematic and/or uniform) position offset for the sequence of measured position values such that an optimization criterion is improved, especially optimized at least locally. In this case, the optimization criterion may comprise a position value deviation term for each time of the sequence of times. The position value deviation term for any one time may depend on the deviation of the estimated pose value for that time from the measured position value shifted by the position offset for that time. Moreover, the optimization criterion may comprise an odometry deviation term for at least some of the times of the sequence of times. In this case, the odometry deviation term for any one time may depend on the deviation of a change in the pose of the vehicle arising from the sequence of estimated pose values at that time from the odometry value for that time.

A software (SW) program is described according to a further aspect. The SW program may be configured to be executed on a processor (e.g., on a controller of a vehicle and/or on a server) and thereby carry out the method described in this document.

A storage medium is described according to a further aspect. The storage medium may comprise a SW program which is configured to be executed on a processor and thereby carry out the method described in this document.

Attention is drawn to the fact that the methods, devices and systems described in this document can be used both on their own and in combination with other methods, devices and systems described in this document. Moreover, any aspects of the methods, devices and systems described in this document can be combined in various ways with one another. In particular, the features of the claims can be combined with one another in various ways.

Below, the invention is described in more detail on the basis of exemplary embodiments.

BRIEF DESCRIPTION OF THE DRAWINGS

FIG. 2b shows an exemplary vehicle trajectory estimated on the basis of the sensor data from FIG. 2a;

FIG. 4b shows an exemplary vehicle trajectory estimated by shifting the position anchors.

DETAILED DESCRIPTION OF THE DRAWINGS

As presented at the outset, the present document considers the precise ascertainment of the trajectory of a vehicle on the basis of the (possibly error-afflicted) sensor data from one or more sensors of the vehicle. In this case, a precise localization of the trajectory within a (global or world) reference coordinate system in particular should be facilitated.

Figure 1:
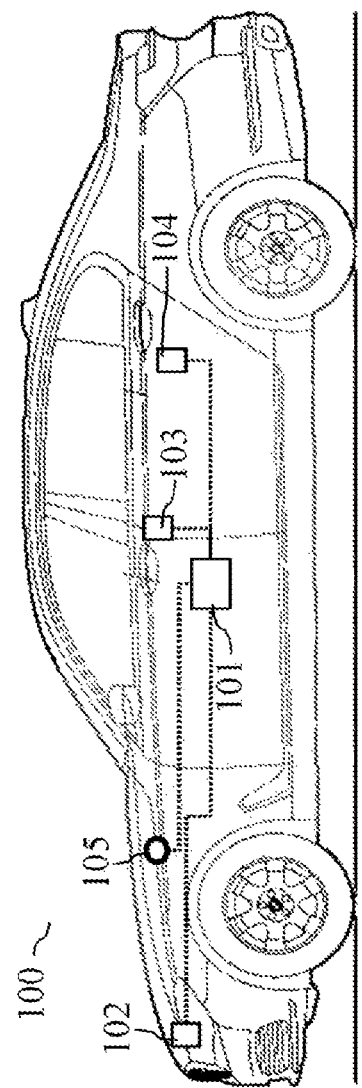
FIG. 1 shows exemplary components of a vehicle.

FIG. 1 shows exemplary components of a vehicle 100. The vehicle 100 comprises one or more environment sensors 102 which are configured to collect sensor data (also referred to as environment data in this document) in relation to the environment of the vehicle 100. Exemplary environment sensors 102 include: an image camera, a radar sensor, a lidar sensor, an ultrasonic sensor, etc. A control unit 101 of the vehicle 100 can be configured to detect one or more objects in the environment of the vehicle 100 on the basis of the environment data (in particular on the basis of image data from a camera). In particular, a landmark (e.g., a building) in the environment of the vehicle 100 can be detected on the basis of the environment data, for which landmark the precise (reference) position is known (within the reference coordinate system). Moreover, a measurement position of the landmark can be ascertained on the basis of the environment data. The measurement position then can be compared to the reference position of the landmark in order to localize the vehicle 100 (within the reference coordinate system).

The vehicle 100 further comprises a position sensor 103 which is configured to collect sensor data (also referred to as position data in this document) in relation to the position of the vehicle 100. The position data can be collected repeatedly over a sequence of times. In particular, the position data may comprise position values for different times, wherein the position value for a specific time indicates the position of the vehicle 100 at that specific time (within the reference coordinate system). A (multidimensional) position value may comprise the GPS coordinates of the vehicle 100, for example. In this case, a position value is typically afflicted by a certain uncertainty (e.g., by a certain standard deviation).

Moreover, the vehicle 100 may comprise one or more vehicle sensors 104 which are configured to collect sensor data (also referred to as vehicle data in this document) in relation to a state of the vehicle 100. By way of example, the vehicle data may indicate: the speed, the orientation, the yaw rate, the acceleration, etc. The control unit 101 may be configured to ascertain a pose of the vehicle 100, that is to say a position and orientation of the vehicle 100 (ascertained on the basis of odometry) on the basis of the vehicle data. By way of example, respective (multidimensional) pose values in relation to the pose of the vehicle 100 may be ascertained on the basis of the vehicle data for a sequence of times. In this case, the individual pose values typically have a certain uncertainty (e.g., a certain standard deviation).

Moreover, the vehicle 100 may comprise a communications unit 105 which is configured to interchange data with an external unit (e.g., with a backend server) via a (wireless) communications link. The vehicle 100 may be configured to transmit the sensor data collected during a journey of the vehicle 100 (in particular the environment data, the position data and/or the vehicle data) to the external unit in order to allow the external unit to ascertain the trajectory (within the reference coordinate system) traveled by the vehicle 100. Alternatively or in addition, the control unit 101 of the vehicle 100 may be configured to (at least partly) ascertain the trajectory traveled by the vehicle 100 on the basis of the collected sensor data, and transmit this to the external unit via the communications unit 105.

Figure 2A:
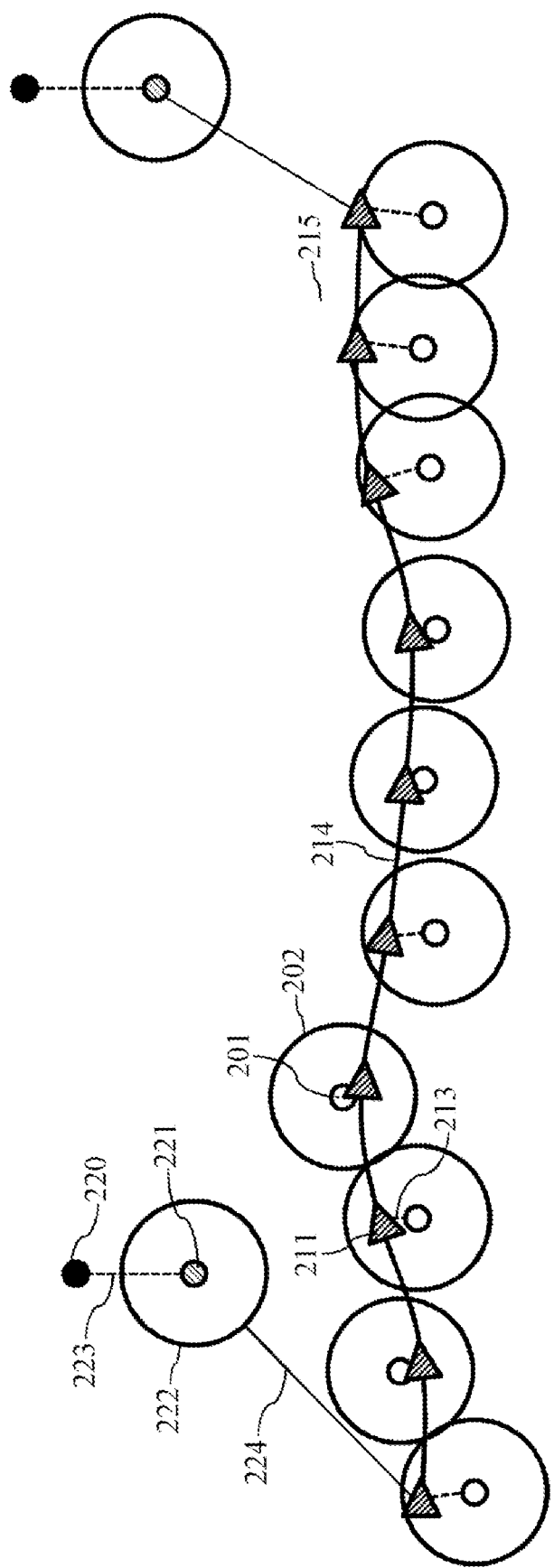
FIG. 2a shows exemplary sensor data along a vehicle trajectory.

FIG. 2a elucidates exemplary sensor data collected during the journey of a vehicle 100. In particular, FIG. 2a shows a sequence of position values 201 over a sequence of successive times. The individual position values 201 have a certain uncertainty, elucidated by the circles 202 around the individual position values 201. As explained above, the individual position values 201 may have been collected (possibly collected only) on the basis of the position sensor 103 of the vehicle 100. The individual position values 201 can be considered to be position variable vertices of a graph 215.

Moreover, FIG. 2a shows pose values 211 for the sequence of times. As presented above, the pose values 211 may have been ascertained (possibly ascertained only) on the basis of the vehicle data from the one or more vehicle sensors 104. The pose values 211 may be pose variable vertices of the graph 215, the graph 215 describing a trajectory of the vehicle 100.

The pose values 211 can be ascertained on the basis of odometry values, wherein an odometry value describes the change in the pose of the vehicle 100 between two pose values 211. The odometry values may be ascertained on the basis of the vehicle data.

In the case of an exact measurement and/or ascertainment of the pose values 211 and the position values 201, the position of the pose value 211 and the position value 201 should in each case correspond at a specific time (under the assumption that the position of the individual pose values 211 is specified relative to the reference coordinate system). Errors and/or inaccuracies when measuring and/or ascertaining the pose values 211 (in particular of the odometry values) and the position values 201, however, cause the position of the pose value 211 and the position value 201 to typically deviate from one another at any specific time. However, in FIG. 2a, the association 213 between the pose value 211 and the position value 201 for the same time is elucidated (by a dashed straight line). The association 213 can be taken into account by way of an edge in the graph 215.

Moreover, landmarks 220 may be detected (on the basis of the environment data) at sporadic times during the journey of the vehicle 100. The (reference) position of a landmark 220 (e.g., a traffic sign) is typically known in this case (e.g., from a previously ascertained digital map). On the other hand, the measurement value 221 of the position of the landmark 220 may be afflicted by a certain error and by a certain uncertainty 222. The error of the measurement value 221 of the position of the landmark 220 may be caused in this case by an error in relation to the estimated value of the position of the vehicle 100. In FIG. 2a, the association 223 between the measurement value 221 of the position and the actual position of a landmark 220 is elucidated (by a dashed straight line). In turn, the association 223 can be taken into account by way of an edge in the graph 215.

The sensor data elucidated in FIG. 2a may be used to estimate the relative position and/or the course of the actual trajectory of the vehicle 100 within the reference coordinate system. To this end, use can be made of what is known as the graph SLAM (simultaneous localization and mapping) process. A graph 215 which describes the pose of the vehicle 100 over a sequence of times can be provided on the basis of the pose values 211. In this case, the individual pose variable vertices of the graph 215 correspond to the individual pose values 211. Directly adjacent pose variable vertices are interconnected via edges, wherein the edges comprise one or more boundary conditions or odometry factors 214 for the transition of a pose value 211 to the directly subsequent pose value 211. In this case, the one or more boundary conditions or odometry factors 214 typically depend on technical properties of the vehicle 100 (such as, e.g., a maximum steering angle, etc.) and/or on measurement uncertainties of the vehicle data. In particular, the odometry factors 214 may depend on the measurement uncertainty of the odometry values between two pose values 211.

The graph SLAM process may be directed to ascertaining the graph 215 which reduces, in particular minimizes, a certain error criterion (e.g., a mean square error) in relation to the deviation of the ascertained graph 215 from the available sensor data. The estimated value of the position of the vehicle 100 at a certain time n can be denoted by $\hat{x}(n)$, for example, while the position value 201 at the time n may be denoted by $p(n)$. Hence, at the time n a position value deviation term $(\hat{x}(n)-p(n))^2$ arises in relation to the deviation of the estimated value of the position from the position value 201. The change between two estimated positions of the vehicle 100 at a specific time n may be referred to as $\hat{d}(n)$, and the odometry value at the specific time n (by means of which the measured change in the position is reproduced) can be denoted by $o(n)$. Then, an odometry deviation term $(\hat{d}(n)-o(n))^2$ arises in relation to the deviation of the estimated position change (in particular the estimated pose change) from the measured position change (in particular the measured pose change). The deviation terms may be weighted, wherein the weighting for the respective term depends on the uncertainty of the respective measurement value for the position or the position change (and reduces with increasing uncertainty). Moreover, the (weighted) deviation terms for all times n=1, ..., N of the considered section of the trajectory to be ascertained may be taken into account, for example added.

Additional measurement values of the position of the vehicle 100 may be ascertained on the basis of a landmark 220 at sporadic times k (e.g., at the times n=1 and n=N in the example illustrated in FIG. 2a). In this case, the estimated value of the position of the vehicle 100 can be adjusted in such a way that the deviation between the measurement value 221 of the position of the landmark 220 and the known reference value (e.g., known from the digital map) of the position of the landmark 220 is reduced. Since the reference value of the position of the landmark 220 typically can be ascertained with relatively high accuracy, the deviation term in relation to a landmark 220 typically has a relatively large weighting within the overall error or optimization criterion.

Figure 2B:
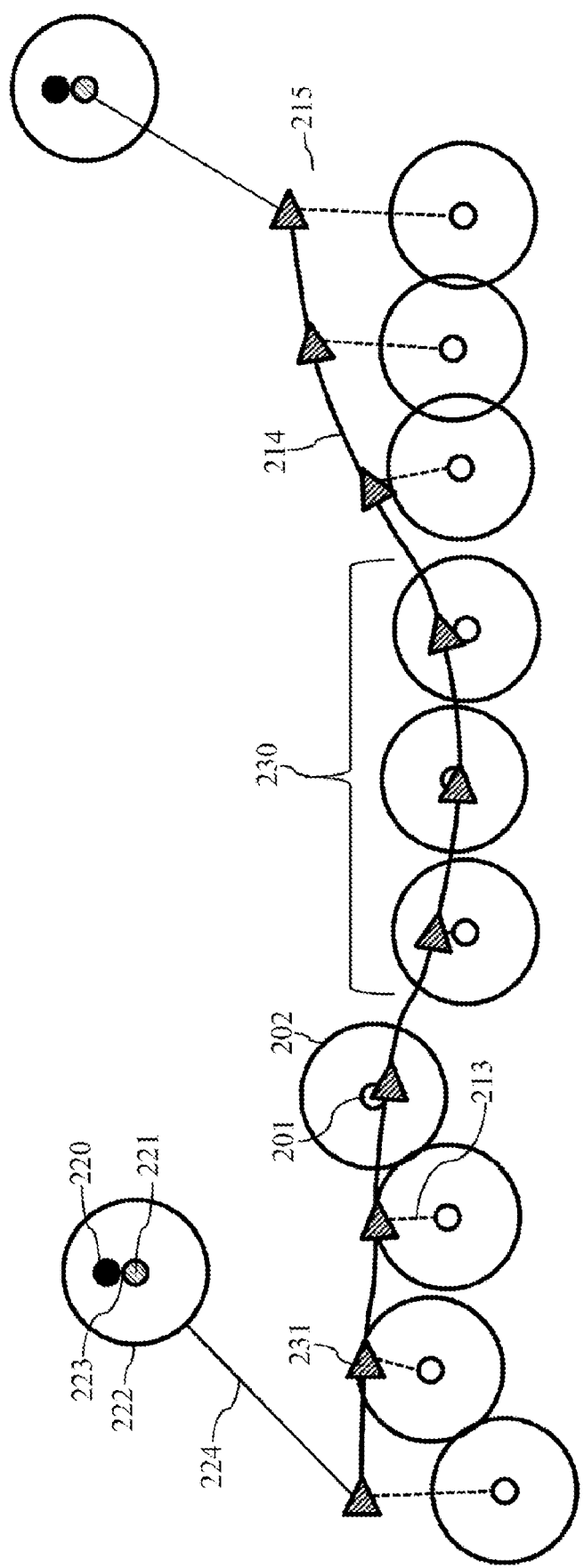

It is then possible to ascertain a graph 215 with a sequence of estimated values for the position of the vehicle 100 or with a sequence of estimated pose values 231 of the vehicle 100 over the sequence of times n=1, ..., N, by means of which the overall error or optimization criterion is reduced, in particular minimized. FIG. 2b shows an exemplary optimized graph 215 with the estimated pose values 231 of the vehicle 100 over the sequence of times n=1, ..., N. The optimized graph 215, in particular the sequence of estimated pose values 231, represents an estimate for the actual trajectory of the vehicle 100.

As may be gathered from FIG. 2b, taking account of sporadic landmarks 220 may lead to the optimized graph 215 representing a relatively good estimate of the actual trajectory of the vehicle 100 in the direct vicinity of a landmark 220. However, on account of systematic errors in the position data, relatively strong deviations may arise between the estimated trajectory (i.e., the sequence of estimated pose values 231) and the actual trajectory of the vehicle 100 in a region 230 between two landmarks 220. In particular, the deviations are caused by virtue of no measurement values 221 for the position of a landmark 220 being available and/or taken into account in a region 230 between two landmarks 220, and the graph 215 (in particular the sequence of estimated pose values 231) is therefore ascertained in such a way that the deviation from the available position values 201 is reduced.

The systematic error in the position data as a result of the relatively strong deviation between the estimated value 231 of the position and the position value 201 in the direct vicinity of the two landmarks 220 is evident in FIG. 2b. The relatively strong deviation of the estimated trajectory (i.e., the sequence of estimated pose values 231) from the actual trajectory of the vehicle 100 in the region 230 between two landmarks 220 leads, as illustrated in FIG. 2b, to "sagging" of the sequence of estimated pose values 231.

The systematic error in the measurement of the position values 201 can be taken into account by virtue of introducing an additional variable (i.e., an additional vertex) during the ascertainment of the graph 215, all position values 201 to be taken into account being able to be shifted together as a result of said additional variable. In particular, the individual position values 201 (i.e., the position variable vertices) may be fastened, in each case via a fixed edge 312, to a common position anchor 312, which can be displaced by a translation movement 323 in order thereby to in each case shift the individual measured position values 201 (i.e., the position variable vertices) in the same way. Optionally, the position anchor 321 may be shifted in accordance with a predefined covariance or probability distribution 322.

Figure 3A:
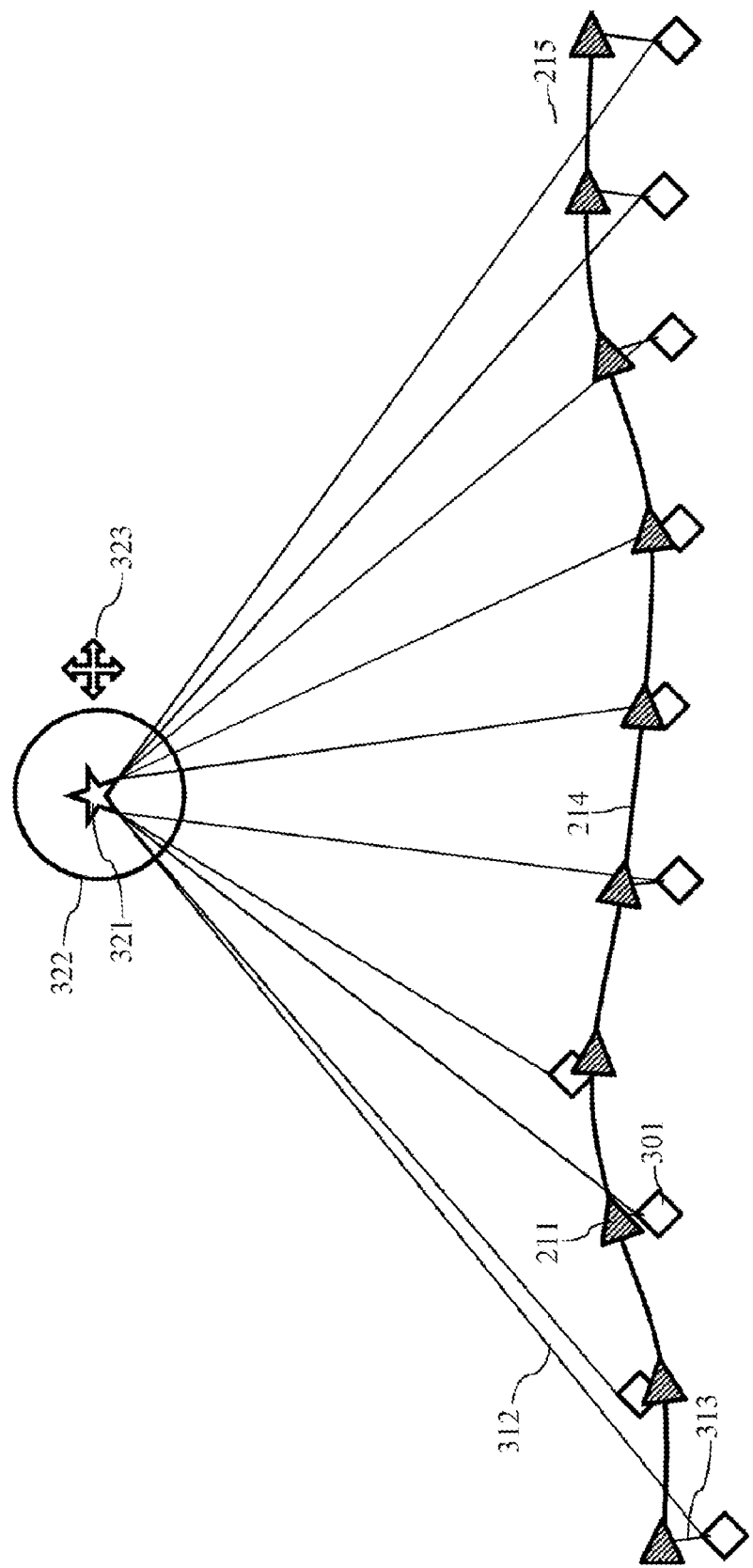
FIG. 3a shows an exemplary position anchor for position values.
Figure 3B:
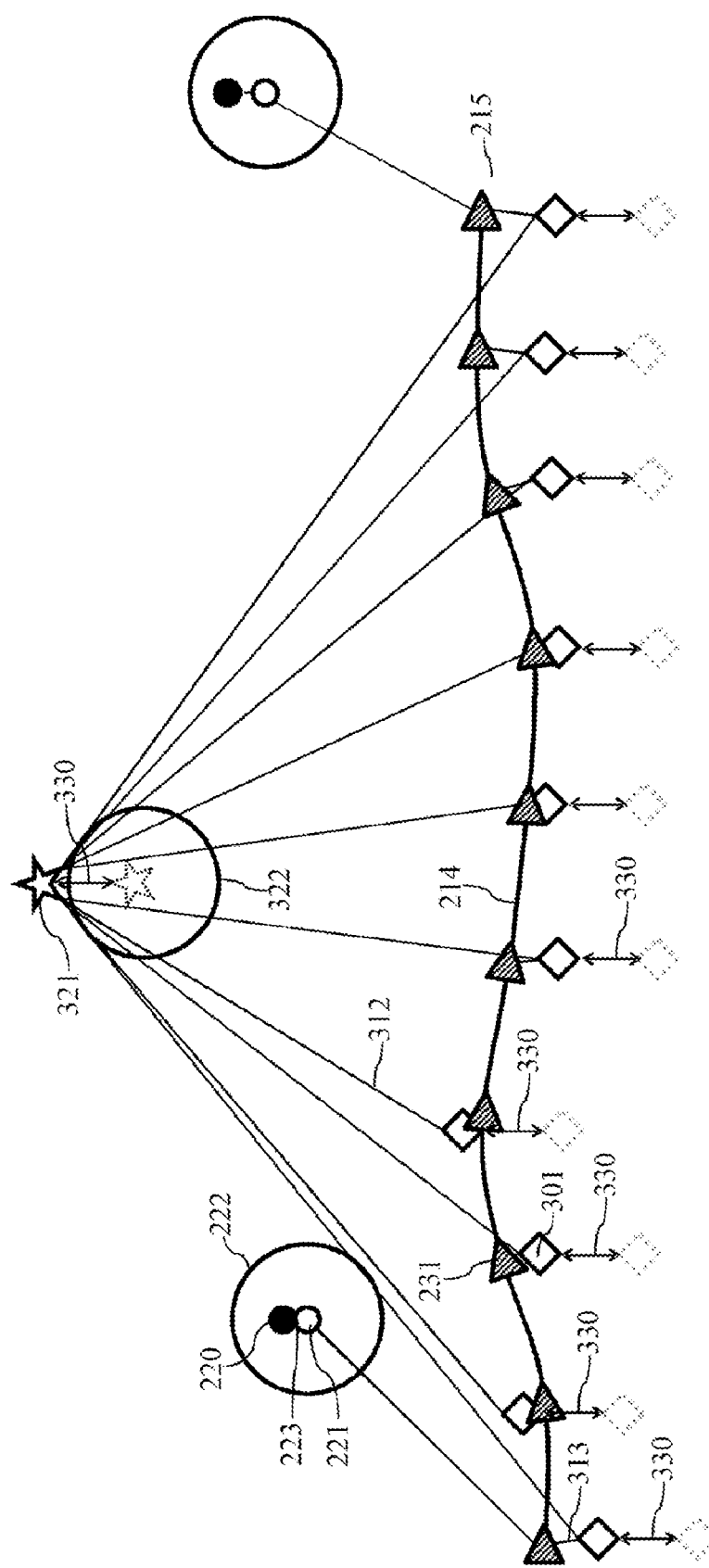
FIG. 3b shows an exemplary vehicle trajectory estimated by shifting the position anchor.

When ascertaining the optimized graph 215 (and hence the sequence of estimated pose values 231), the position anchor 321 consequently may be shifted (in particular shifted by translation 323) as an additional degree of freedom. The shift can be effected by a position offset 330. As a consequence thereof, a systematic error of the measured position values 201 can be ascertained implicitly (by the shift of the position anchor 321) and can be compensated for. The size of the systematic error is described by the position offset 330 in this case. Moreover, it is thus possible to avoid deviations of the optimized graph 215 (in particular the sequence of estimated pose values 231) from the actual trajectory of the vehicle 100, which deviations can be traced back to a systematic error of the measured position values 201. FIG. 3b shows an optimized graph 215 (in particular an optimized sequence of estimated pose values 231) and the shift of the position anchor 321 brought about within the scope of the optimization.

Figure 4A:
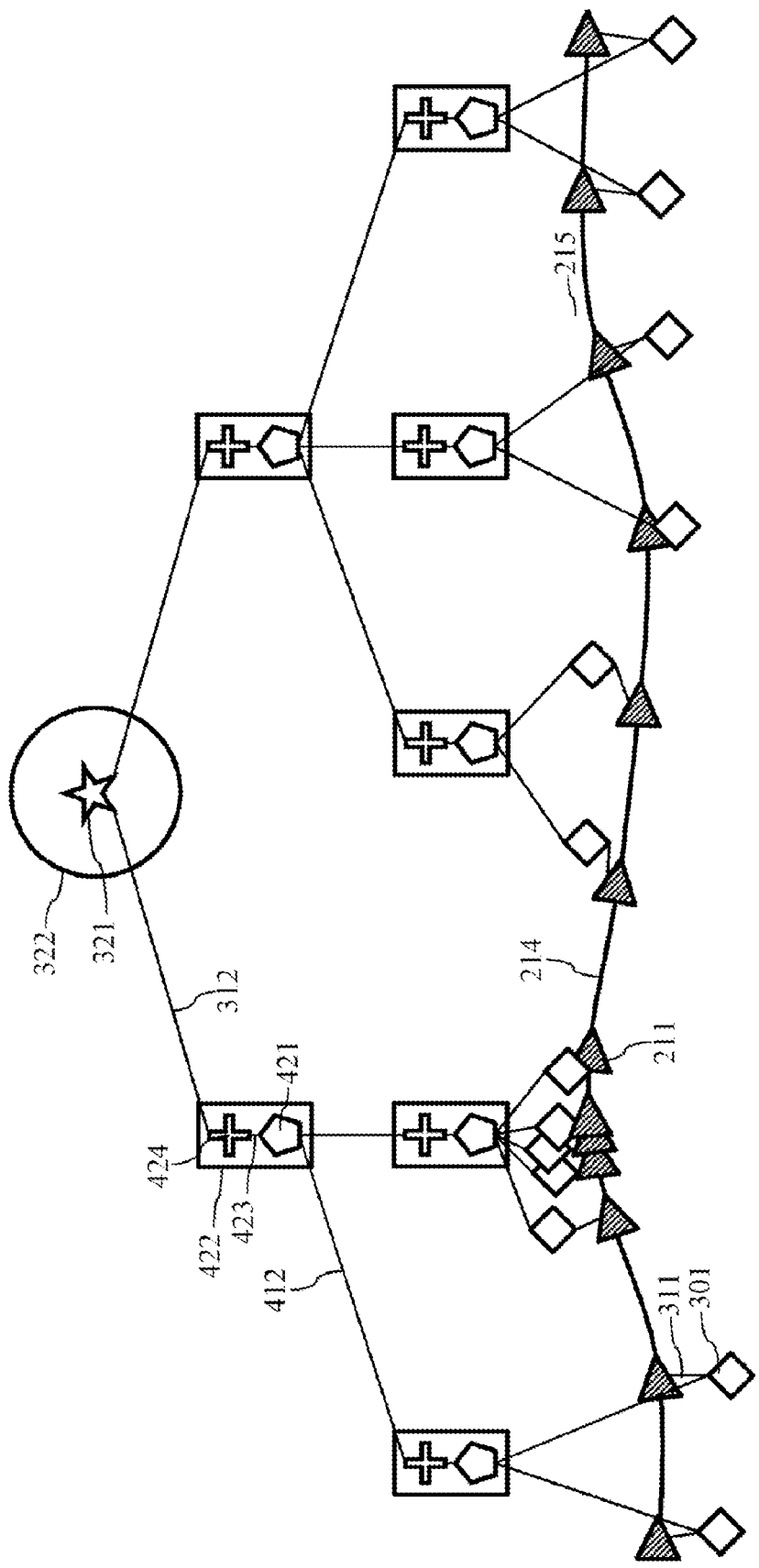
FIG. 4a shows an exemplary tree of position anchors for different subsequences of position values.

The systematic error when collecting the measured position values 201 may depend on the direct vicinity of the vehicle 100. By way of example, a relatively high building in the direct vicinity of the vehicle 100 may lead to a change in the systematic error (e.g., as a result of multipath effects). In order to be able to take into account different systematic errors in different segments of a trajectory, it is possible to use a tree or a hierarchy of anchors 321, 421, as illustrated in FIG. 4a. In particular, an intermediate anchor 421 can be defined for each segment of the trajectory, the measured position values (or a position variable 301 corresponding to the position values) of the respective segment being fixedly linked to said intermediate anchor. The intermediate anchors 421 can then be shifted in accordance with a covariance or probability distribution 422 of the respective intermediate anchor 421 relative to an anchor point 424 (illustrated by the link 423). The anchor points 424 of the individual intermediate anchors may then be connected to the (main) position anchor 321 (optionally via one or more further levels of intermediate anchors 421).

As may be gathered from FIG. 4b, systematic errors of the position values 201 can thus be taken into account in the individual segments of the trajectory in order to ascertain an optimized graph 215, that is to say an estimate of the actual trajectory, in a particular precise manner.

Consequently, this document describes a method with which a systematic error when measuring the position, in particular within the scope of a GPS-based position measurement, can be taken into account and can be at least partly compensated for. The systematic error in the position measurement may be caused by atmospheric effects or by local effects, such as the shielding by a building wall or a forest. The systematic error may lead to measurements correlating with one another and not being independent of one another. For the systematic error based on atmospheric effects, this relates to all measurements during a certain period of time, for example when passing through a certain area or during a journey of the vehicle 100. Additionally, local effects may also occur, within the scope of which shadowing and multipath effects may occur in a certain region, for example in front of a high house, and lead locally to a systematic error.

In the method described in this document, a graph SLAM process is extended by modeling of systematic errors of the position data. Here, each measured position value 201 (or a position variable vertex 301 corresponding to the measured position value 201) is connected to a position anchor 321 via a rigid edge 312. The position anchor 321 can be defined such that the position anchor (vertex) 321 can be shifted (exclusively) by a translation 323 via a prior with set covariances 322. As a result, a systematic shift of all measured position values 201 or position variable vertices 301 is implicitly integrated in the factor graph 215. That is to say, the graph SLAM optimization takes account of systematic errors in the position data when determining the journey trajectory and, in the process, ascertains the most probable systematic shift of the measured position values 201 or of the position variable vertices 301. As a result of a hierarchic system with a plurality of intermediate anchors 421, it is also possible to model and determine local systematic errors in the position measurement.

The described method can be used in the localization of journey trajectories, as required in particular for identifying changes and for the provision of map patches. Initially, a factor graph 215 is constructed. In this case, the individual measured position values 201 are not used directly as prior for the vehicle position at the respective times. Instead, a corresponding position variable is introduced as position variable vertex 301 to the factor graph 215 for each position measurement. These position variable vertices 301 can each be connected by way of a position factor 313 (that is to say by way of appropriate edges) to associated vehicle pose or pose variable vertices 211. The uncertainty of the position measurements originally contained in the position prior can be modeled by the position factor 313. Additionally, all position variable vertices 301 are connected to a virtual position anchor variable 321 via virtual ideally rigid edges 312. This position anchor variable 321 can represent a pose (position+orientation) and is typically provided in turn with a prior (that is to say with a probability distribution 322 in relation to the pose of the position anchor variable 321). In order to facilitate the systematic shift of all position variable vertices 301, this prior preferably has a translation covariance 322, which encodes the corresponding assumptions in respect of the systematic shift. The orientation of the anchor pose may be fixed by an ideally small orientation covariance in order to avoid a rotation of the position anchor variables 321 (and in order thus to ensure reliable modeling of the systematic error of the position measurement).

As a result of the rigid factors 312 between the position variable vertices 301 and the anchor vertex 321, the internal geometry between the position variable vertices 301 is maintained and "arbitrary" systematic translations can be modeled and optimized within the factor graph 215. This leads to an improved localization of the journey trajectory and to a systematic shift of the position measurements.

Moreover, a hierarchic system with a plurality of intermediate anchors 421 is described. As a result, it is possible to also model local systematic errors. The construction of the neighborhood relationships may be carried out in time and/or in space. As a result, it is possible to model and take account of various local systematic errors. If this variant is used for the synchronous localization of a plurality of trajectories (e.g., of a plurality of vehicles 100), the intermediate anchors 421, among themselves, can be linked to one another on account of spatial or temporal proximity, in order to model the spatial and/or temporal dependencies of the underlying errors in the position measurement over various trajectories. An example of a spatial dependency is a systematic error caused by a house wall. A temporal dependency may be caused by ionospheric conditions at a certain time or by identical satellite constellation for different journeys at the same time.

Figure 5:
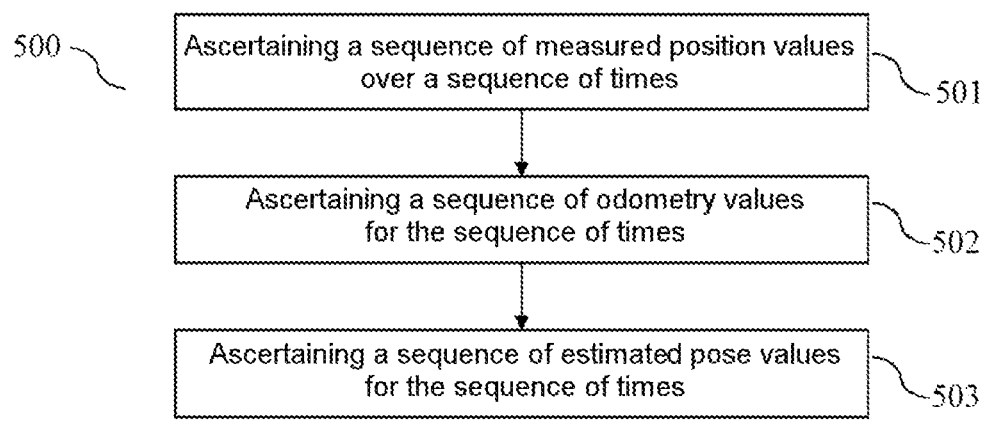
FIG. 5 shows a flowchart of an exemplary method for ascertaining a trajectory of a vehicle.

FIG. 5 shows a flowchart of an exemplary method 500 for estimating an actual trajectory of a vehicle 100. By way of example, the method 500 can be carried out by a control unit 101 of the vehicle 100 and/or by a vehicle-external unit (e.g., a backend server).

The method 500 comprises the ascertainment 501, on the basis of the sensor data from a position sensor 103 (e.g., on the basis of the sensor data from a GPS receiver), of a sequence of measured position values 201 (e.g., GPS coordinates) in relation to the respective position of the vehicle 100 over a corresponding sequence of times. In particular, a measured position value 201 at any one time may indicate the position of the vehicle 100 at that time relative to a reference coordinate system. The position sensor 103 may be part of the vehicle 100. The measured position values 201 may reproduce a measured trajectory of the vehicle 100 (measured by means of the sensor data from the position sensor 103).

Moreover, the method 500 comprises the ascertainment 502, on the basis of sensor data from one or more vehicle sensors 104, of a sequence of odometry values for at least a part of the sequence of times. In this case, the odometry value for any one time may indicate how the pose of the vehicle 100 has changed in comparison with a preceding time. The sequence of times may comprise, e.g., n=1, . . . , N times. Then, a respective odometry value can be provided for the times n=2, . . . , N, an odometry value indicating how the pose of the vehicle 100 has changed in relation to the respectively directly preceding time n−1.

For the purposes of ascertaining the odometry values, the one or more vehicle sensors 104 may indicate, e.g., the speed, the distance traveled, the yaw rate, the rotational rate, and/or the acceleration of the vehicle 100. Alternatively or in addition, the odometry values may be ascertained on the basis of one or more control variables, by means of which, e.g., the drive motor, a braking device and/or a steering device of the vehicle 100 is controlled. The individual odometry values may each indicate the change in the position and/or the change in the orientation of the vehicle 100. A relative trajectory of the vehicle 100 may be reproduced on the basis of the sequence of odometry values, said trajectory being able to be converted into the estimate of the actual trajectory by way of translation and/or rotation.

The method 500 further comprises the ascertainment 503 (as an estimate of the actual trajectory of the vehicle 100) of a sequence of estimated pose values 231 for the sequence of times, and the ascertainment of a (systematic) position offset 330 for the sequence of measured position values 201. The estimated pose value 231 for any one time may indicate the pose of the vehicle 100 at that time relative to the reference coordinate system. The sequence of estimated pose values 231 and the position offset 330 may be ascertained in such a way that an optimization criterion is improved, especially optimized at least locally.

In this case, the optimization criterion may comprise a position value deviation term for each time of the sequence of times. The position value deviation term for any one time may depend on the deviation 313 of the estimated pose value 231 at that time from the measured position value 201 shifted by the position offset 330 at that time. Consequently, it is possible to ascertain a sequence of estimated pose values 231, by means of which the (mean, optionally square) deviation of the estimated pose values 231 from the measured position values 201 respectively shifted by the position offset is reduced, in particular minimized. By taking account of a position offset 330, a systematic error in the measurement of the measured position values 201 can be identified and compensated for in an efficient and precise manner. In this way, it is possible to increase the accuracy of an estimate for the actual trajectory.

Moreover, the optimization criterion may comprise an odometry deviation term for at least some of the times of the sequence of times (in particular for the times n=2, . . . , N). In this case, the odometry deviation term at any one time n may depend on the deviation of a change in the pose of the vehicle 100, arising from the sequence of estimated pose values 231, at that time from the odometry value for that time. The optimization criterion may for example comprise an (optionally weighted) sum of the position value deviation terms and the odometry deviation terms. By taking account of position value deviation terms and odometry deviation terms, it is possible to provide a precise estimate of the actual trajectory.

As a result of the measures described in this document, it is possible to increase the quality of the localization of a trajectory relative to an existing digital map and/or increase the quality during the synchronous localization of a plurality of trajectories by means of common landmark sightings (e.g., the sighting of signs, traffic lights, road markings, etc.) by modeling systematic global and local errors in the position measurement. In particular, the quality of the localization of the journey trajectories can be improved relative to a map or relative to one another by way of the implicit modeling of systematic errors. The methods described in this document may be used, for example, for recognizing changes and for learning highly accurate digital maps (e.g., for automated driving).

The present invention is not restricted to the exemplary embodiments shown. In particular, it should be noted that the description and the figures are only intended to elucidate the principle of the proposed methods, devices and systems.

What is claimed is:

1. A device for estimating an actual trajectory of a vehicle, comprising:
a control unit configured to:
ascertain a sequence of measured position values over a corresponding sequence of times based on sensor data from a position sensor, wherein a measured position value at any one time indicates a position of the vehicle at that time relative to a reference coordinate system;
ascertain a sequence of odometry values based on sensor data from one or more vehicle sensors, wherein an odometry value at any one time indicates how a pose of the vehicle has changed in comparison with a previous time;
ascertain, with respect to a specific time of the sequence of times, a measurement position of a landmark in a surrounding of the vehicle on a basis of sensor data from one or more surround sensors of the vehicle; and
ascertain a sequence of estimated pose values with respect to the sequence of times and a position offset with respect to the sequence of measured position values as an estimate of the actual trajectory of the vehicle so as to improve an optimization criterion, wherein
an estimated pose value at any one time indicates the pose of the vehicle at that time relative to the reference coordinate system,
the optimization criterion comprises a position value deviation term with respect to each time of the sequence of times,
the position value deviation term at any one time depends on a deviation of the estimated pose value at that time from the measured position value shifted by the position offset at that time,
the optimization criterion comprises an odometry deviation term with respect to at least some of the times of the sequence of times,
the odometry deviation term at any one time depends on a deviation of a change in the pose of the vehicle at that time, which arises from the sequence of estimated pose values, from the odometry value at that time,
the optimization criterion comprises a landmark deviation term, and
the landmark deviation term depends on a deviation of the measurement position of the landmark from a known actual reference position of the landmark in the reference coordinate system.

2. The device according to claim 1, wherein at least one of:
(a) the measured position values have a position measurement uncertainty, and
the optimization criterion depends on the position measurement uncertainty of the measured position values in such a way that an increase in the position measurement uncertainty leads to a reduction in an effect of the position value deviation terms on the optimization criterion; or
(b) the odometry values have an odometry measurement uncertainty, and
the optimization criterion depends on the odometry measurement uncertainty of the odometry in such a way that an increase in the odometry measurement uncertainty leads to a reduction in an effect of the odometry deviation terms on the optimization criterion.

3. The device according to claim 1, wherein the control unit is configured to:
ascertain the position offset with respect to the sequence of measured position values in such a way that a value of the position offset is the same for all measured position values of the sequence of measured position values and/or for all times of the sequence of times; and/or
the position offset is a systematic position offset.

4. The device according to claim 1, wherein at least one of:
the control unit is configured to restrict a value of the position offset to a maximum value; or
the control unit is configured to ascertain the value of the position offset while taking account of a covariance of the position offset; or
the optimization criterion comprises a term by way of which an increase in a magnitude of the value of the position offset is penalized.

5. The device according to claim 1, wherein the control unit is configured to:
subdivide the sequence of times into a plurality of successive subsequences;
shift the measured position values of a subsequence, in each case by a systematic partial position offset with respect to the subsequence and by the position offset with respect to the entire sequence; and
ascertain the sequence of estimated pose values with respect to the sequence of times, the position offset with respect to the entire sequence of measured position values and a plurality of partial position offsets with respect to the plurality of subsequences such that the optimization criterion is improved and optimized at least locally.

6. The device according to claim 1, wherein the control unit is configured to create a graph, wherein the graph comprises the individual estimated pose values of the sequence of estimated pose values as pose variable vertices, the graph comprises an odometry factor as an edge between a pose variable vertex corresponding to any one time and a pose variable vertex corresponding to a preceding time, said odometry factor depending on the sensor data from the one or more vehicle sensors and/or indicating a movement of the vehicle between the two pose variable vertices and/or depending on the odometry value corresponding to that time, the graph comprises a position variable vertex with respect to each of the position values of the sequence of measured position values, the graph comprises with respect to each of the pose variable vertices an association via a position factor and/or via an edge to a corresponding position variable vertex, the position variable vertices of the graph are connected to a position anchor in such a way that a shift of the position anchor leads to a corresponding shift in the position variable vertices, and the control unit is configured to ascertain the sequence of estimated pose values by optimizing the graph.

7. The device according to claim 6, wherein optimizing the graph comprises at least one of:
shifting the position anchor; or
changing one or more estimated pose values of the sequence of estimated pose values; or
shifting one or more pose variable vertices of the graph.

8. The device according to claim 6, wherein
within a scope of optimizing the graph, the control unit is configured to change a pose of the position anchor on a basis of a probability distribution with respect to the pose of the position anchor, and
the probability distribution is such that a translation of the position anchor is facilitated, and a rotation of the position anchor is substantially suppressed.

9. The device according to claim 6, wherein
the sequence of times comprises a plurality of successive subsequences,
the position variable vertices of the graph of a subsequence are each connected to an intermediate anchor such that a shift of the intermediate anchor leads to a corresponding shift of the position variable vertices of the subsequence, and
the intermediate anchors of the plurality of subsequences are connected to the position anchor in such a way that a shift of the position anchor leads to a corresponding shift of the intermediate anchors of the plurality of subsequences.

10. The device according to claim 1, wherein the control unit is configured to:
ascertain the estimate of the actual trajectory of the vehicle by way of a graph simultaneous localization and mapping (SLAM) process, and
shift a displaceable anchor vertex by the position offset within graph SLAM process.

11. The device according to claim 1, wherein
the optimization criterion comprises at least one further deviation term, which causes an increase in magnitude of the value of the position offset; and/or
the control unit is configured to ascertain alternative data in relation to the position of the vehicle and to ascertain a value of a further deviation term of the optimization criterion on a basis of the alternative data.

12. The device according to claim 1, wherein at least one of:
a measured position value comprises GPS coordinates, in relation to a position of the vehicle within a reference coordinate system of a road network; or
an odometry value comprises coordinates in relation to a change in the position of the vehicle within a coordinate system of the vehicle; or
the coordinate system of the vehicle is shifted in relation to the reference coordinate system.

13. The device according to claim 1, wherein the control unit is configured to create and/or adapt a digital map in relation to a road network on a basis of the estimate of the actual trajectory of the vehicle.

14. The device according to claim 1, wherein the control unit is configured to:
receive the sensor data of the position sensor of the vehicle, or data derived therefrom, from the vehicle;
receive the sensor data of the one or more vehicle sensors of the vehicle, or data derived therefrom, from the vehicle; and
ascertain a sequence of estimated pose values with respect to the sequence of times on a basis of the received data.

15. The device according to claim 1, wherein the control unit is configured to:
respectively ascertain, with respect to a plurality of journeys in a segment of a road network, a sequence of measured position values over a corresponding sequence of times;
respectively ascertain, with respect to the plurality of journeys, a sequence of odometry values with respect to at least a part of the sequence of times; and
respectively ascertain, with respect to the plurality of journeys, a sequence of estimated pose values with respect to the sequence of times and a position offset such that an optimization criterion is optimized at least locally, in each case.

16. A method for estimating an actual trajectory of a vehicle, the method comprising:
ascertaining a sequence of measured position values over a corresponding sequence of times based on sensor data from a position sensor, wherein a measured position value at any one time indicates a position of the vehicle at that time relative to a reference coordinate system;
ascertaining a sequence of odometry values with respect to at least a part of the sequence of times based on sensor data from one or more vehicle sensors, wherein an odometry value at any one time indicates how a pose of the vehicle has changed in comparison with a previous time;
ascertaining, with respect to a specific time of the sequence of times, a measurement position of a landmark in a surrounding of the vehicle on a basis of sensor data from one or more surround sensors of the vehicle; and
ascertaining a sequence of estimated pose values with respect to the sequence of times and ascertaining a position offset with respect to the sequence of measured position values as an estimate of the actual trajectory of the vehicle such that an optimization criterion is improved, wherein
an estimated pose value at any one time indicates the pose of the vehicle at that time relative to the reference coordinate system,
the optimization criterion comprises a position value deviation term with respect to each time of the sequence of times, the position value deviation term at any one time depends on a deviation of the estimated pose value at that time from the measured position value shifted by the position offset at that time, the optimization criterion comprises an odometry deviation term with respect to at least some of the times of the sequence of times, the odometry deviation term at any one time depends on a deviation of a change in the pose of the vehicle at that time, which arises from the sequence of estimated pose values, from the odometry value at that time, the optimization criterion comprises a landmark deviation term, and the landmark deviation term depends on a deviation of the measurement position of the landmark from a known actual reference position of the landmark in the reference coordinate system.

* * * * *